(12) United States Patent
Perktold et al.

(10) Patent No.: US 9,686,822 B2
(45) Date of Patent: Jun. 20, 2017

(54) GLASS-MELTING ELECTRODE WITH COOLING DEVICE AND COOLING DEVICE FOR A GLASS-MELTING ELECTRODE

(71) Applicant: PLANSEE SE, Reutte (AT)

(72) Inventors: Helmut Perktold, Lermoos (AT); Dietmar Sprenger, Waengle (AT); Hannes Traxler, Lechaschau (AT)

(73) Assignee: Plansee SE, Reutte (AT)

( * ) Notice: Subject to any disclaimer, the term of this patent is extended or adjusted under 35 U.S.C. 154(b) by 0 days.

(21) Appl. No.: 14/437,515

(22) PCT Filed: Oct. 18, 2013

(86) PCT No.: PCT/AT2013/000177
§ 371 (c)(1),
(2) Date: Apr. 22, 2015

(87) PCT Pub. No.: WO2014/063176
PCT Pub. Date: May 1, 2014

(65) Prior Publication Data
US 2015/0245413 A1     Aug. 27, 2015

(30) Foreign Application Priority Data
Oct. 22, 2012   (AT) ............................ GM411/2012 U

(51) Int. Cl.
| | | |
|---|---|---|
| C03B 5/027 | (2006.01) |
| H05B 7/06 | (2006.01) |
| H05B 3/03 | (2006.01) |
| C03B 5/167 | (2006.01) |
| H05B 7/12 | (2006.01) |
| H05B 3/00 | (2006.01) |

(52) U.S. Cl.
CPC ............... *H05B 3/03* (2013.01); *C03B 5/027* (2013.01); *C03B 5/167* (2013.01); *H05B 3/0004* (2013.01); *H05B 7/12* (2013.01); *H05B 2203/025* (2013.01)

(58) Field of Classification Search
CPC .......... H05B 3/03; H05B 3/0004; H05B 7/12; H05B 7/08; H05B 7/101; C03B 5/027; C03B 5/167; C03B 5/03
USPC ........ 373/27, 28, 29, 32, 36, 37, 38, 39, 88, 373/90, 93, 54
See application file for complete search history.

(56) References Cited

U.S. PATENT DOCUMENTS

| 3,148,239 A | 9/1964 | Pinotti |
| 3,649,733 A | 3/1972 | Schlienger |

(Continued)

FOREIGN PATENT DOCUMENTS

| CN | 201334426 Y | 10/2009 |
| DE | 102004031242 B3 | 8/2005 |

(Continued)

*Primary Examiner* — Hung D Nguyen
(74) *Attorney, Agent, or Firm* — Laurence A. Greenberg; Werner H. Stemer; Ralph E. Locher

(57) ABSTRACT

A glass-melting electrode has a cooling device. The glass-melting electrode has an electrode body with a blind hole, and the cooling device has a cooling tube which can be inserted into the blind hole in order to feed coolant into the blind hole. The cooling device has a flow distributor with at least three outlet openings. The flow distributor is arranged at an end of the cooling tube which has been inserted into the blind hole, such that coolant flows through the flow distributor into the blind hole.

23 Claims, 4 Drawing Sheets

(56) References Cited

U.S. PATENT DOCUMENTS

| | | | | |
|---|---|---|---|---|
| 3,769,441 A | * | 10/1973 | Schlienger | H05B 7/12 373/90 |
| 2005/0286605 A1 | | 12/2005 | Rott | |
| 2007/0064763 A1 | | 3/2007 | Hunnius et al. | |
| 2012/0039352 A1 | | 2/2012 | Hirt et al. | |
| 2012/0269225 A1 | | 10/2012 | Picciotto et al. | |

FOREIGN PATENT DOCUMENTS

| | | |
|---|---|---|
| DE | 102006036002 A1 | 3/2007 |
| GB | 979147 A | 1/1965 |
| WO | 2011073244 A1 | 6/2011 |

\* cited by examiner

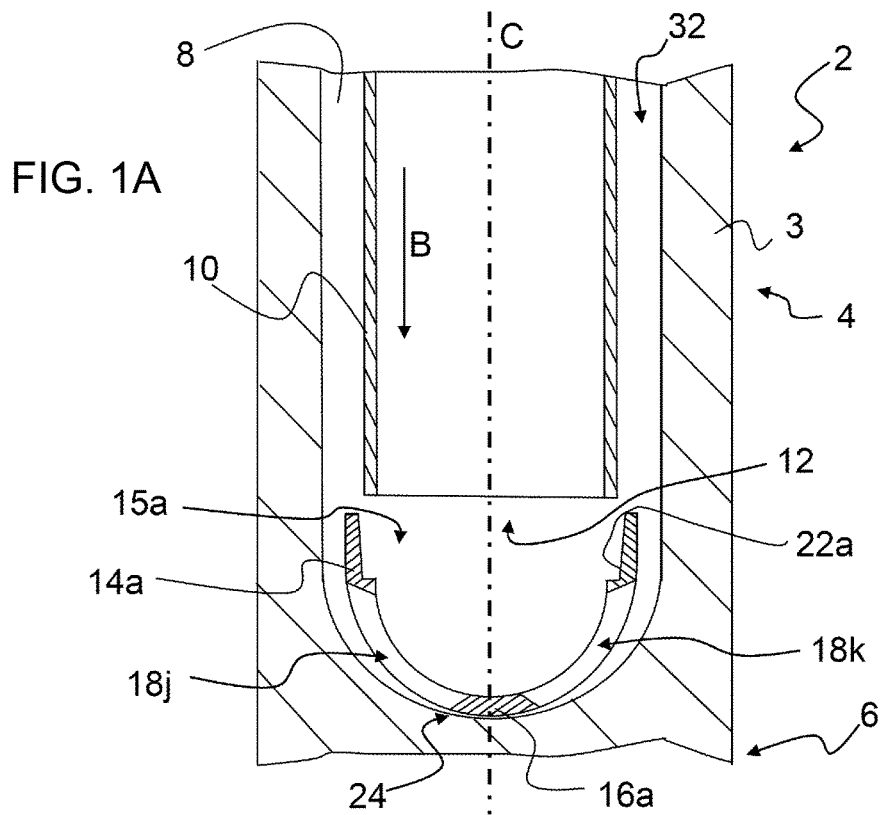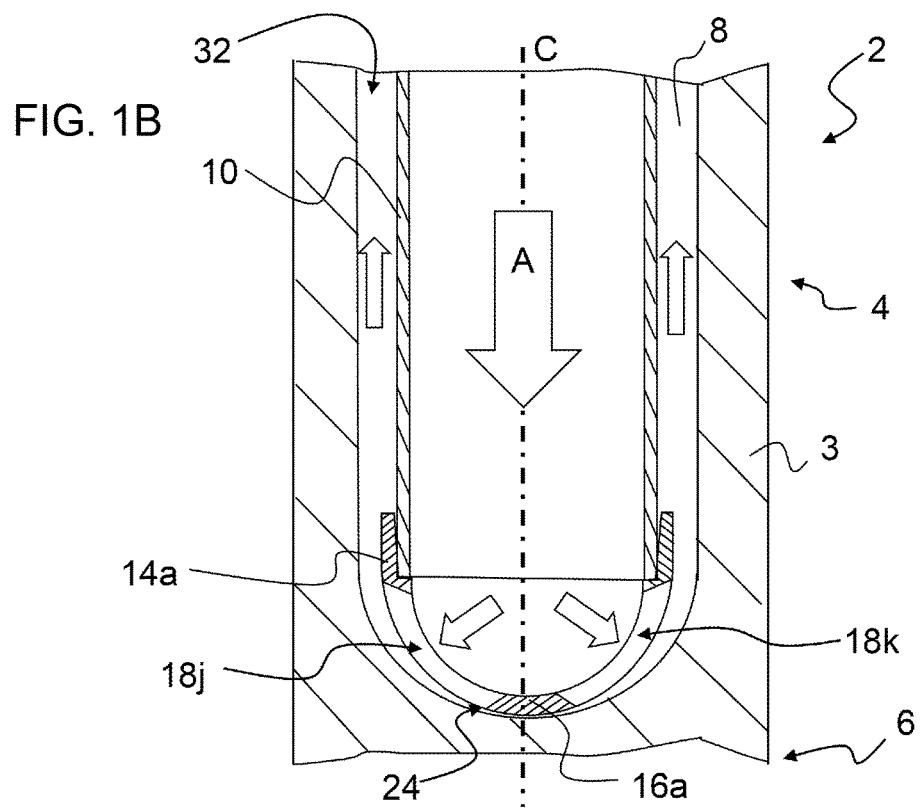

Detail X

GLASS-MELTING ELECTRODE WITH COOLING DEVICE AND COOLING DEVICE FOR A GLASS-MELTING ELECTRODE

BACKGROUND OF THE INVENTION

Field of the Invention

The invention relates to a glass-melting electrode with a cooling device and also to a cooling device for cooling a glass-melting electrode.

US 2012/0039352 A1 discloses a glass-melting electrode in the electrode body of which there is formed a blind hole. A tube can be inserted into the blind hole in order to feed coolant into the electrode body. The blind hole extends through a shaft of the electrode body into the electrode head, the tube lying spaced apart from the inner walls of the blind hole in the installed state. A coolant stream emerges from an open end of the tube, flows in the direction of the blind hole base and is then discharged from the electrode via an annular gap between the tube and the blind hole wall.

BRIEF SUMMARY OF THE INVENTION

It is an object of the invention to provide a glass-melting electrode with a cooling device and also a cooling device for a glass-melting electrode which efficiently cools an electrode body of the electrode.

This object is achieved by the features as claimed.

The dependent claims relate to advantageous configurations.

As claimed, a glass-melting electrode, hereinbelow 'electrode', is provided with a cooling device. The electrode or an electrode body of the electrode has a blind hole, into which a coolant for cooling the electrode body can be fed during operation of the electrode. The cooling device has a cooling tube which can be inserted into the blind hole in order to feed coolant into the at least one blind hole. That is to say that the electrode body is actively cooled by the cooling device in that the fluid coolant fed in carries away the heat which arises during the use of the electrode. By way of example, coolant which has been fed into the blind hole is discharged from the electrode body via an (annular) gap between the cooling tube and the blind hole wall, e.g. via a coolant connection at an open end of the electrode body lying opposite to the blind hole base.

The cooling device furthermore has a flow distributor with at least three outlet openings. During operation of the electrode, i.e. when the cooling tube has been inserted, the flow distributor is arranged at an end of the cooling tube which lies in the blind hole, such that coolant flows into or is fed into the at least one blind hole through the cooling tube and then through the flow distributor. In other words, the flow distributor is arranged in front of or above the open end of the cooling tube. Without a flow distributor, coolant would be fed into the blind hole in the direction of the blind hole base in an undirected manner over the entire cross section of the cooling tube—i.e. over the open end of the cooling tube—such that the coolant stream impinges on or 'hits' the blind hole base. This gives rise to flows and turbulence which are unfavorable for the removal of heat. By means of the flow distributor or the outlet openings, the coolant stream is distributed in the blind hole, for example directed onto the blind hole walls, such that a uniform coolant stream is generated and as a result there is an efficient removal of heat or efficient cooling of the electrode body.

It is preferable that the flow distributor or the outlet openings is or are formed in such a way that a coolant stream is fed in parallel or substantially parallel to the inner wall of the blind hole. That is to say that the coolant stream which emerges through the outlet openings is directed onto the inner walls of the blind hole in such a way that a uniform continuous flow along the blind hole walls is generated, and therefore so too a uniform removal of heat. By way of example, after the electrode has been assembled, the flow distributor is arranged centrically in relation to the inner wall of the blind hole. In other words, the flow distributor and the blind hole are oriented axially, i.e. they are arranged along a common axis. By way of example, the outlet openings or the opening cross sections of the outlet openings can be arranged parallel or substantially parallel to the inner wall of the blind hole, i.e. the spacing between the opening cross section and the blind hole wall is constant or substantially constant.

According to one configuration, the spacing between the flow distributor and the blind hole wall or inner wall increases with an increasing distance from the electrode axis. That is to say that the greater the distance from the electrode axis, the greater the spacing between the flow distributor and the blind hole. The discharge gap between the flow distributor and the blind hole wall thus increases in size from the inside outward. As a result, a uniform directed flow radially outward is generated in the critical flow region in which low flow rates prevail—i.e. in the region close to the electrode axis at the blind hole base or between the blind hole base and the flow distributor. This discharge gap increasing continuously in size is adjoined by the side walls of the blind hole, which run parallel or substantially parallel to the flow distributor or cooling tube and are at a constant radial distance from the electrode axis. That is to say that a constant or substantially constant discharge gap adjoins the discharge gap increasing in size in the region of the blind hole base.

It is preferable that at least part of the flow distributor or part of the outer surface of the flow distributor, which faces toward the blind hole wall, is connected to the blind hole or to the wall or inner surface of the blind hole. That is to say that part of the flow distributor bears against an inner surface or walls of the blind hole base. As a result, the flow distributor and the electrode body are connected to one another in a heat-conducting manner. By way of example, at least part of the outer surface of the flow distributor is soldered to the blind hole wall. That is to say that, in addition to the cooling of the electrode body by means of convection, heat is transferred by means of heat conduction or conduction from the electrode body to the flow distributor. Then, the heat transferred to the flow distributor is carried away by coolant flowing past the flow distributor.

It is particularly preferable that at least part of the flow distributor is connected to the blind hole base, such that heat can be carried away from the blind hole base or from the electrode head or from the electrode tip as described above by way of heat conduction or conduction. During the use of an electrode such as, for example, a glass-melting electrode, the electrode head or the electrode tip is that part of an electrode which is subjected to the highest level of loading, i.e. the part of the electrode at which the greatest evolution of heat takes place. Furthermore, the coolant flow close to the electrode axis at the blind hole base is particularly low, and therefore the cooling action or heat transfer by means of convection is limited in this region. A heat-conducting connection at the blind hole base eliminates this limitation, such that the electrode has longer service lives owing to the efficient cooling.

According to one configuration, the flow distributor has a closed tip region or the flow distributor does not have an opening in a tip region, such that the closed tip region can be connected in a heat-conducting manner to the blind hole base. By way of example, the diameter of the closed tip region amounts to at least 15%, 25%, 30%, 40% or 50% of the external diameter of the flow distributor, in order to provide an efficient heat transfer by means of heat conduction.

It is preferable that the part of the closed outer surface of the flow distributor has at least one spacer. That is to say that, if the flow distributor is arranged in the blind hole on the blind hole base, a gap determined by the spacer is maintained between the flow distributor and the blind hole base. Solder metal can be introduced into the gap, for example, in order to connect the flow distributor and the electrode body to one another in a heat-conducting manner.

According to one configuration, the sum total of the cross sections of all of the outlet openings of the flow distributor is equal to or substantially equal to the feed cross section or internal cross section of the cooling tube. As a result, a dynamic pressure or drop in pressure is avoided when coolant is fed or introduced into the blind hole. In order to provide a uniform distribution of the flow by way of the flow distributor, provision is made, for example, of at least 3, 5, 7, 10 or 15 outlet openings. It is preferable that the outlet openings are distributed uniformly over a circumference of the flow distributor and are separated from one another in each case by a web. The higher the number of outlet openings, the more uniform the distribution of the coolant.

It is particularly preferable that at least part of the outlet openings extends as far as a tip of the flow distributor which bears against or is fastened to the blind hole base. That is to say that it is ensured that coolant flows as far as the region of the blind hole or of the electrode which is connected to the flow distributor, i.e. as far as the region at which heat is carried away from the electrode body by means of heat conduction. This ensures an optimum transition between the two heat transfer mechanisms, i.e. the electrode body is cooled by means of coolant or convection directly following the cooling by means of heat conduction in the flow distributor fastened to the blind hole base.

It is preferable that the blind hole or the blind hole base has a semicircular or substantially semicircular form. In particular, the transition from the blind hole base to the side walls of the blind hole is formed continuously or without an edge or step, such that a uniform, substantially non-vortical coolant flow along the entire inner surface of the blind hole is ensured, and therefore so too a uniform removal of heat over the entire electrode body.

In this configuration of the blind hole base, it is preferable that the flow distributor or a region of the flow distributor facing toward the blind hole base has a semicircular or substantially semicircular form. Thus, if a spacer as described above is provided, a uniform spacing is ensured between the flow distributor and the blind hole base, into which solder metal, for example, can be introduced for the heat-conducting connection.

A gap for discharging coolant from the blind hole is preferably formed between the cooling tube and the blind hole wall. That is to say that the external diameter of the cooling tube is smaller than the diameter of the blind hole. The sum total of the opening cross sections of the multiplicity of openings is equal to or substantially equal to the cross section of the discharge gap, such that a dynamic pressure or drop in pressure is prevented when the coolant is fed to or discharged from the blind hole.

It is preferable that the flow distributor has spacers, such that the flow distributor is centered in the blind hole. That is to say that spacers ensure that the flow distributor is arranged centrally in the blind hole, such that a uniform spacing between the flow distributor and the blind hole wall is provided, and therefore so too a uniform coolant stream or uniform and efficient cooling of the electrode body. By way of example, at least three spacers, e.g. in the form of protruding lugs, are arranged on the circumference of the flow distributor.

According to a preferred configuration, the cooling tube has spacers, such that the cooling tube is centered in the blind hole. By way of example, firstly the flow distributor can be fastened to the blind hole base, and then the cooling tube can be inserted into the blind hole, such that the cooling tube end is introduced in a reception opening of the flow distributor. The spacers on the cooling tube ensure that the cooling tube is already centered as it is being inserted into the blind hole and can be inserted easily or without tilting into, for example, a reception opening of the flow distributor.

The flow distributor preferably has a reception opening, in order to at least partially receive an end of the cooling tube. That is to say that the external diameter of the cooling tube is the same as or smaller than the internal diameter of the flow distributor or of the reception opening, such that the cooling tube can be inserted into the flow distributor. Alternatively, the cooling tube has a reception opening, in which case the external diameter of the flow distributor is the same as or smaller than the internal diameter of the cooling tube, such that the cooling tube can be pushed over the flow distributor. In each configuration, the cooling tube (end) and the flow distributor overlap at least partially in the axial direction of the electrode or in the direction in which the cooling tube is inserted. That is to say that even given different lengths or given changes in length of the cooling tube, a secure and leak-tight connection between the cooling tube and the flow distributor is ensured. Different lengths of the cooling tube can arise, for example, on account of manufacturing tolerances. Changes in length of the cooling tube can arise, for example, on account of temperature fluctuations during operation of the electrode.

According to one configuration, the reception opening of the flow distributor (into which the cooling tube is inserted) or the reception opening of the cooling tube (into which the flow distributor is inserted) is inclined or tapers obliquely in the direction in which the cooling tube or the flow distributor is inserted. This facilitates the insertion or connection of the two components cooling tube/flow distributor.

It is preferable that the blind hole extends over a region of the electrode or of the electrode body which is arranged above a glass melt during use of the glass-melting electrode. In other words, during use of the electrode, the blind hole and the blind hole base are arranged above a glass melt, or are not immersed in the glass melt. That is to say that the partial region of the electrode which is arranged above a glass melt during use is cooled in the manner described above. This prevents a situation in which the material (e.g. molybdenum) of the electrode body part protruding out of the glass melt oxidizes on account of the high temperatures and then sublimates. In the case of the part of the electrode which is immersed in a glass melt, such oxidation of the electrode body material is prevented by the glass melt which surrounds said electrode part.

As claimed, provision is made of a cooling device with a flow distributor for an electrode body, in particular for an electrode body as described above. The elements and functions of the cooling device as claimed correspond to the elements and functions of the cooling device described above.

BRIEF DESCRIPTION OF THE SEVERAL VIEWS OF THE DRAWING

Embodiments of the invention will be explained in more detail with reference to the figures, in which:

FIGS. 1a-b show a schematic lateral sectional illustration of a glass-melting electrode with a cooling device, which has a flow distributor according to a first configuration.

DESCRIPTION OF THE INVENTION

Figure 2:
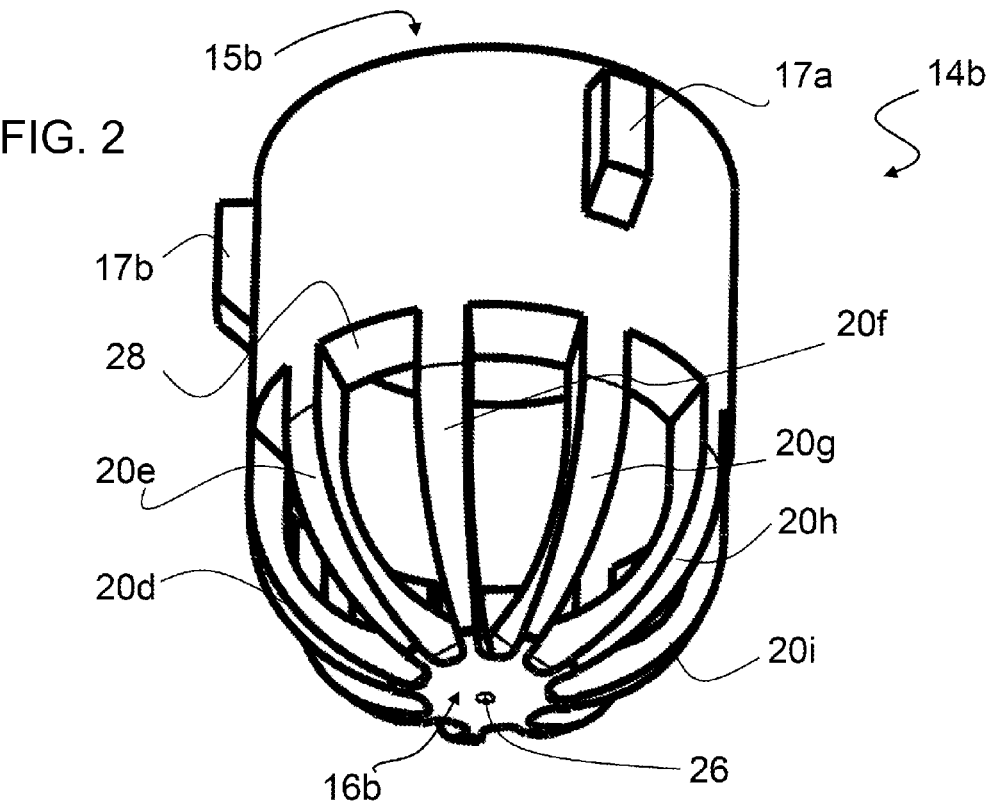
FIG. 2 shows a perspective view of a flow distributor according to a second configuration.

FIGS. 1a-b show a schematic partial illustration, which is not true to scale, of a glass-melting electrode 2 in a lateral sectional view. The top region or the top end of the electrode 2, at which connections for coolant, electrical current etc. are provided or arranged, is not shown. The glass-melting electrode 2 has a single-part electrode body 3 and a cooling device. A blind hole 8 is formed in the electrode body 3, extending through a shaft 4 of the body 3 into an electrode head 6. The electrode head 6 or the electrode tip, which is immersed in a glass melt during use of the electrode 2, is only shown in part to provide a clearer illustration. A cooling device is arranged in the blind hole 8 in order to feed coolant into the blind hole and remove it again, such that the electrode body 3 can be actively cooled during operation of the electrode 2. The blind hole 8 extends over a region of the glass-melting electrode 2 which lies above a glass melt during use. That is to say that, during use of the electrode 2, the blind hole base lies above a glass melt, such that that part of the electrode 2 which is arranged above the glass melt is cooled. This prevents a situation in which the material (e.g. molybdenum) or the surface of the electrode body 3 oxidizes on account of the high temperatures during the glass melting and then possibly sublimates. Such oxidation of the electrode body material is prevented on the part of the electrode 2 which is immersed in a glass melt during use (i.e. at the electrode head 6) by the glass melt which surrounds the electrode head 6.

The cooling device has, inter alia, a cooling tube 10 and a flow distributor 14a according to a first configuration. The flow distributor 14a is fitted at or over an open end 12 or an inflow opening of the cooling tube 10, such that coolant A is fed into the blind hole 8 through the cooling tube 10 and the flow distributor 14a or through the outlet openings 18j-k thereof.

As shown schematically by arrows in FIG. 1b, coolant A is conducted to the side walls of the blind hole 8 by means of the outlet openings 18j-k of the flow distributor 14a, such that a uniform coolant stream A and therefore a continuous removal of heat along or parallel to the blind hole walls is generated. If coolant is conducted into the blind hole 8 without the flow distributor 14a, i.e. only through the open end of the cooling tube 10, flows or turbulence which are unfavorable for the removal of heat would form at the blind hole base. The service life of the electrode 2 is increased considerably by the efficient cooling by means of the flow distributor 14a.

As shown in FIG. 1a, the flow distributor 14a is fastened to the blind hole base, for example in that the flow distributor 14a is soldered to the blind hole 8. By way of example, solder metal can be introduced into a gap 24 between the flow distributor 14a and the blind hole base and is then melted by heating the electrode body 3 or the electrode head 6, in order to produce a connection between the two components. That is to say that the flow distributor 14a is integrally connected to the electrode head 6, such that a heat-conducting connection is produced between the two components. Heat is thus transferred from the electrode body 3 or from the electrode head 6 to the flow distributor 14a in the region of the blind hole base by means of heat conduction or conduction, with the flow distributor 14a being cooled in turn by the coolant A flowing past it.

That is to say that the electrode is cooled by means of two heat transfer Mechanisms—by means of convection, i.e. by the coolant A, and by means of heat conduction or conduction.

A fold 22a for receiving the cooling tube 10 is formed around a reception opening 15a of the flow distributor 14a. The fold 22a tapers obliquely, such that the diameter of the reception opening 15a is reduced from the top downward in the insertion direction B, as a result of which the insertion of the cooling tube 10 into the reception opening 15a is made easier.

FIG. 1b shows the assembled electrode 2, i.e. the cooling tube 10 is arranged in its end position on the fold base. Different lengths of the cooling tube 10 are compensated for by the fold 22a. By way of example, different lengths on account of manufacturing tolerances, and changes in length of the cooling tube 10, which arise during operation of the electrode 2 on account of temperature fluctuations. A leak-tight connection is ensured in this way between the cooling tube and the flow distributor.

As can be seen in FIG. 1b, coolant A flows in the electrode 2 in the cooling tube 10 downward into the flow distributor 14a, through the outlet openings 18j-k thereof to the side walls of the blind hole 8 and through an outflow gap 32 between the cooling tube 10 and the blind hole 8 upward again out of the electrode 2 or out of the blind hole 8.

Coolant is fed to and removed from the electrode 2 appropriately by means of a corresponding coolant connection (not shown) at the top end of the electrode shaft 4.

In order to prevent a pressure loss or dynamic pressure of the coolant in the electrode 2, the feed cross section of the cooling tube 10 corresponds substantially to the sum total of the cross sections of all of the outlet openings 18j-k, and to the cross section of the outflow gap 32.

FIG. 2 shows a flow distributor 14b according to a second configuration, which can be used in an electrode 2 or an electrode body 3 and with a cooling tube 10 as is shown and described in FIGS. 1a-b. Corresponding or identical elements of the flow distributors 14a and 14b are denoted by corresponding or identical reference signs and, unless specified otherwise, have the same functions and advantages.

In contrast to the above-described flow distributor 14a, the flow distributor 14b shown in FIG. 2 has spacers 17a-c on its circumference. The spacers 17a-c ensure that the flow distributor 14b is centered during insertion into the blind hole 8. That is to say that a continuous coolant stream A can emerge through the outlet openings 18a-i circumferentially around the flow distributor 14b. In this example, provision is made of nine outlet openings 18a-i and correspondingly nine webs 20a-i. In addition, the cooling tube 10 can have spacers (not shown) on its circumference, such that the cooling tube 10 is likewise centered during insertion into the blind hole 8 and can be inserted easily, in particular without tilting, into the reception opening 15b of the flow distributor 14b.

In this configuration of the flow distributor 14b, the groove 22b has a straight Form—i.e. it does not taper obliquely—since the two components are centered in the blind hole 8 by the spacers (both on the flow distributor 14 and on the cooling tube) and therefore can easily be inserted one into another. All of the spacers are formed in such a way that they do not impair the coolant stream A or impair it only negligibly.

Figure 3:
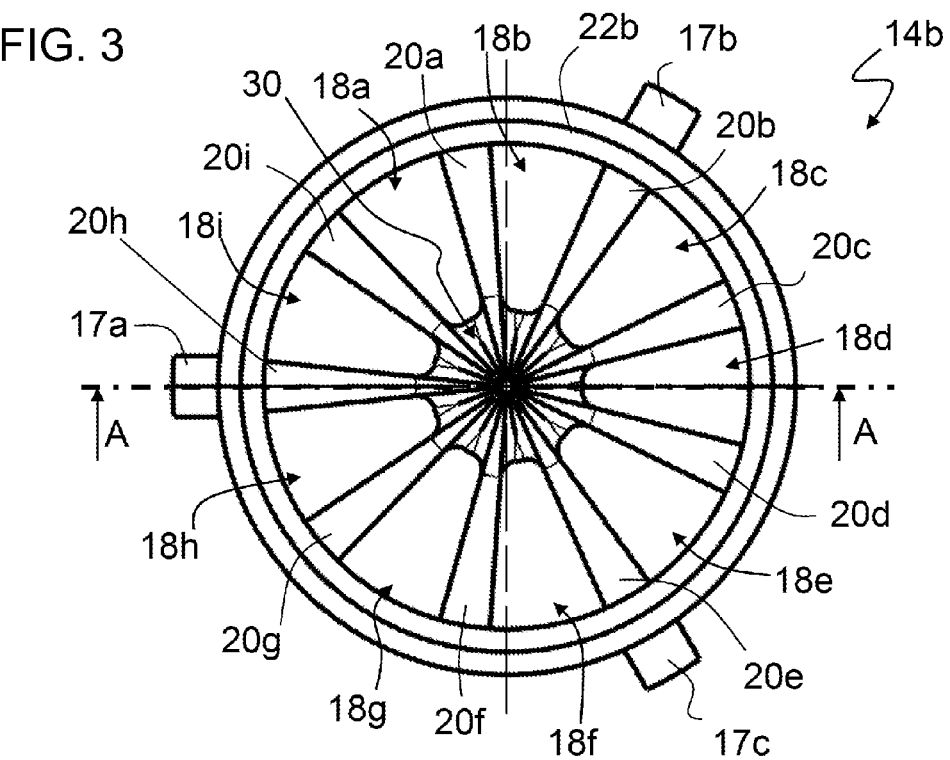
FIG. 3 shows a plan view of the flow distributor shown in FIG. 2.

FIG. 3 shows a plan view of the inner surface of the flow distributor 14b shown in FIG. 2. Lamellae or webs 20a-i, between which there are arranged the outlet openings 18a-i, are formed uniformly along the circumference of the flow distributor 14b. It can clearly be seen that the outlet openings 18a-i have an inclined or oblique opening rim 30 or an oblique edge on the inner side of the tip 16. That is to say that the edge 30 tapers in the direction of the coolant stream A, such that a coolant stream A is conducted outward in the direction of the blind hole walls. Correspondingly, a (top) opening rim 28 or a top edge (FIG. 2) has an oblique form, such that a coolant stream A is conducted to the blind hole wall. In particular, the outlet openings 18a-i generate a coolant stream parallel or substantially parallel to the blind hole walls, i.e. a buildup of coolant or turbulence caused by the perpendicular impact of coolant on blind hole walls is prevented.

Figure 4:
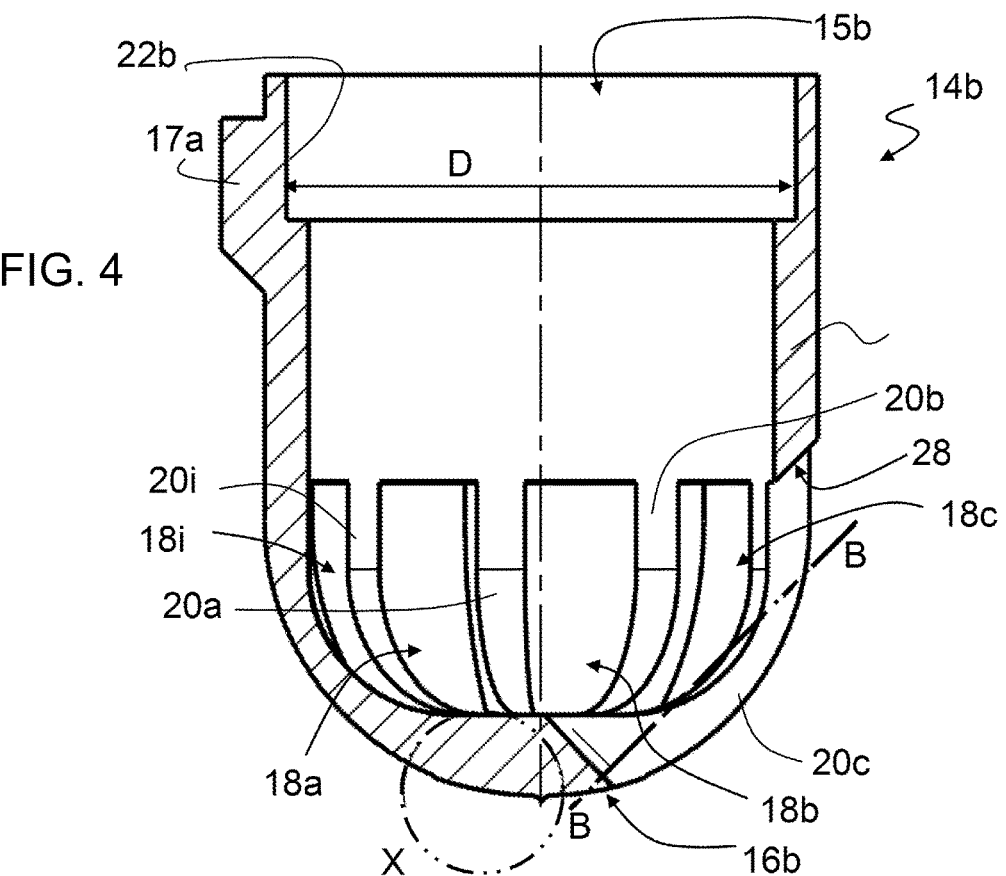
FIG. 4 shows a lateral sectional view of the flow distributor shown in FIG. 2.
Figure 4A:
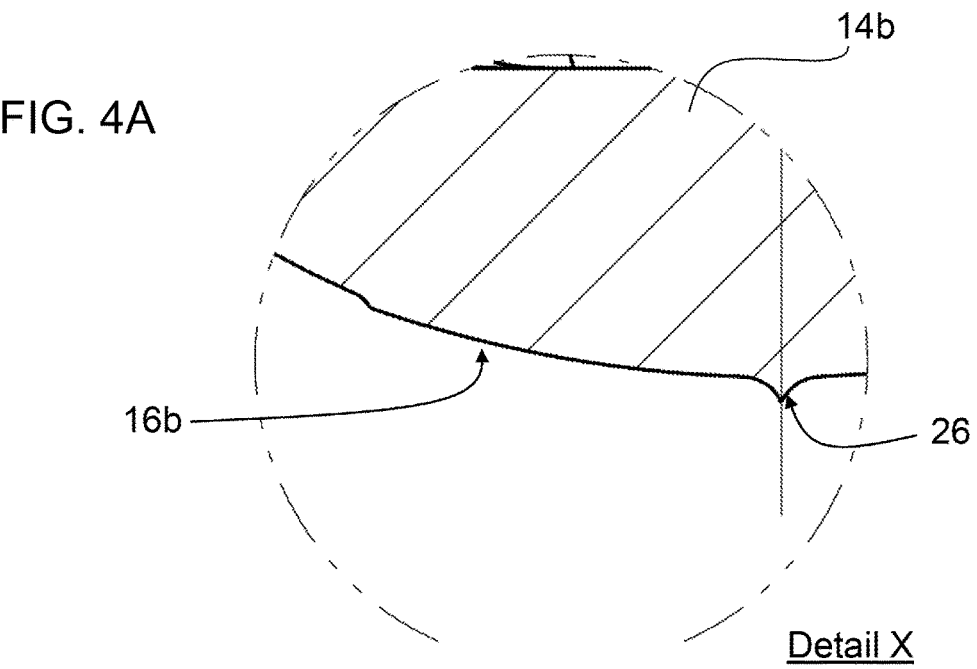
FIG. 4a shows a detail of the view shown in FIG. 4.

FIG. 4 shows a sectioned side view of the flow distributor 14b shown in FIG. 2 along the line A-A (FIG. 3), and FIG. 4a shows a detail X of the tip 16b shown in FIG. 4.

In contrast to the above-described flow distributor 14a, the flow distributor 14b has a spacer tip 26. After the flow distributor 14b has been inserted into the blind hole 8, the spacer tip 26 ensures that there is a spacing or gap 24 between the blind hole base and the flow distributor 14b. Solder metal, for example, is introduced into the gap 24 produced by the spacer tip, such that a heat-conducting connection as described above is formed between the flow distributor 14b and the electrode body.

Figure 5:
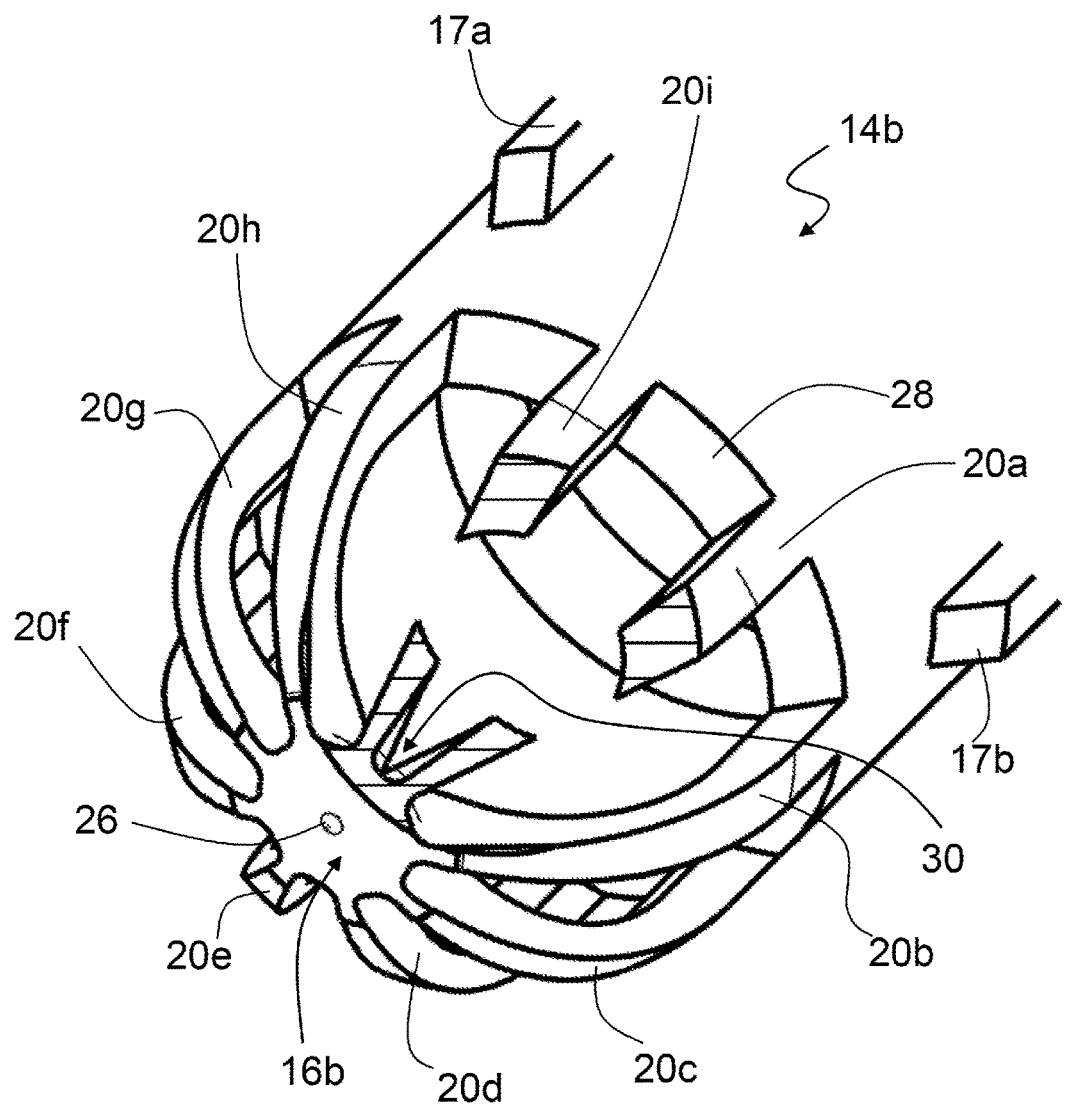
FIG. 5 shows a partially sectioned perspective view of the flow distributor shown in FIG. 2.

FIG. 5 shows a sectioned perspective view of the flow distributor 14b shown in FIG. 2 along the line B-B (FIG. 4). As already described above, here the oblique or inclined formation of the bottom opening edge 30 can be seen. That is to say that the oblique opening edge 30 ensures that a coolant stream A is conducted in the direction of the outlet openings 18a-i immediately when it impinges on the tip of the flow distributor 14b, such that there is already a flow parallel or substantially parallel to the blind hole walls when the coolant emerges from the flow distributor 14b. That is to say that no or hardly any turbulence arises in the blind hole.

LIST OF REFERENCE SIGNS

2 Electrode
3 Electrode body
4 Electrode shaft
6 Electrode head
8 Blind hole
10 Cooling tube
12 Open end/inflow opening
14a-b Flow distributor
15a-b Reception opening
16a-b Flow distributor tip
17a-c Spacer
18a-k Outlet opening
20a-i Web/lamella
22a-b Fold
24 Fastening gap
26 Spacer tip
28 Top opening edge
30 Bottom opening edge
32 Outflow gap
A Coolant
B Cooling tube insertion direction
C Electrode axis

The invention claimed is:

1. An electrode assembly, comprising:
a glass-melting electrode with an electrode body having a blind hole formed therein, said blind hole having a blind hole wall;
a cooling device with a cooling tube having an end configured for insertion into said blind hole and for feeding coolant into said blind hole;
said cooling device having a flow distributor with at least three outlet openings disposed at said end of said cooling tube inserted in said blind hole, with coolant flowing through said flow distributor into the blind hole;
wherein at least a part of said flow distributor is connected in a heat-conducting connection to said electrode body; and
wherein at least part of an outer surface of said flow distributor is soldered to said blind hole wall.

2. The electrode assembly according to claim 1, wherein said blind hole is formed with side walls and said outlet openings are formed to conduct a coolant stream parallel to or substantially parallel to said side walls of said blind hole.

3. The electrode assembly according to claim 1, wherein a spacing distance between said flow distributor and said blind hole walls increases with an increasing distance from the electrode axis.

4. The electrode assembly according to claim 1, wherein, with said cooling tube inserted into said blind hole, said flow distributor bears against an open end of said cooling tube.

5. The electrode assembly according to claim 1, wherein said flow distributor has a closed tip region and a diameter of said closed tip region amounts to at least 15%, 25%, 30%, 40% or 50% of an external diameter of said flow distributor.

6. The electrode assembly according to claim 1, wherein a sum total of the cross sections of all of said outlet openings is equal to or substantially equal to a feed-in cross section of said cooling tube.

7. The electrode assembly according to claim 1, wherein at least some of said outlet openings extend as far as a tip of said flow distributor which bears against a base of said blind hole.

8. The electrode assembly according to claim 1, wherein said blind hole has a blind hole base with a semicircular or substantially semicircular form.

9. The electrode assembly according to claim 8, wherein said flow distributor has a semicircular or substantially semicircular form.

10. The electrode assembly according to claim 1, wherein a discharge gap for discharging coolant from said blind hole is formed between said cooling tube and said blind hole and a sum total of the cross sections of all of said outlet openings is equal to or substantially equal to a cross section of said discharge gap.

11. The electrode assembly according to claim 1, wherein said flow distributor includes spacers configured to center said flow distributor in said blind hole.

12. The electrode assembly according to claim 1, wherein said cooling tube includes spacers configured to center said cooling tube in said blind hole.

13. The electrode assembly according to claim 1, wherein said cooling tube and said flow distributor overlap at least partially in an axial direction.

14. The electrode assembly according to claim 1, wherein said flow distributor is formed with a reception opening and said cooling tube is formed with a reception opening, and wherein said reception opening of said flow distributor or said reception opening of said cooling tube tapers obliquely in an insertion direction.

15. The electrode assembly according to claim 1, wherein said blind hole is formed in a region of said electrode body to be arranged above a glass melt during use of said glass-melting electrode.

16. The electrode assembly according to claim 1, wherein said electrode body comprises an electrode head formed in one piece with an electrode shaft.

17. A cooling device for cooling a glass-melting electrode, said cooling device comprising:
    a cooling tube for feeding coolant into a blind hole formed in an electrode body of the glass-melting electrode, said cooling tube having an end to be inserted into the blind hole; and
    a flow distributor formed with at least three outlet openings, said flow distributor being disposed at said end of said cooling tube to be inserted into the blind hole;
    wherein at least a part of said flow distributor is to be connected in a heat-conducting connection to the electrode body of the glass-melting electrode; and
    wherein at least part of an outer surface of said flow distributor is soldered to a wall of said blind hole.

18. The cooling device according to claim 17, wherein said flow distributor comprises spacers for centering said flow distributor in the blind hole.

19. The cooling device according to claim 17, wherein said flow distributor has a semicircular or substantially semicircular shape.

20. The cooling device according to claim 17, wherein said flow distributor has a closed tip region and a diameter of said closed tip region amounts to at least 15%, 25%, 30%, 40% or 50% of an external diameter of said flow distributor.

21. The cooling device according to claim 17, wherein at least a part of said outlet openings extends as far as a region of said flow distributor that can be fastened on a blind hole base.

22. The cooling device according to claim 17, wherein a sum total of the cross sections of all of said outlet openings is equal to, or substantially equal to, a feed-in cross section of said cooling tube.

23. An electrode assembly, comprising:
    a glass-melting electrode with an electrode body having a blind hole formed therein;
    a cooling device with a cooling tube having an end configured for insertion into said blind hole and for feeding coolant into said blind hole;
    said cooling device having a flow distributor with at least three outlet openings disposed at said end of said cooling tube inserted in said blind hole, with coolant flowing through said flow distributor into said blind hole; and
    wherein at least a part of said flow distributor is connected in a heat-conducting connection to said electrode body;
    wherein said blind hole has side walls and said outlet openings are formed to conduct a coolant stream parallel to or substantially parallel to said side walls of said blind hole; and
    wherein at least part of an outer surface of said flow distributor is soldered to a wall of said blind hole.

* * * * *